(12) United States Patent
Allain et al.

(10) Patent No.: US 7,295,870 B2
(45) Date of Patent: *Nov. 13, 2007

(54) METHOD FOR THE DETECTION AND AUTOMATIC CHARACTERIZATION OF NODULES IN A TOMOGRAPHIC IMAGE AND A SYSTEM OF MEDICAL IMAGING BY TOMODENSIMETRY

(75) Inventors: Pascal Raymond Allain, Versailles (FR); Guy-Michel Hourdin, Antony (FR); Matthieu Ferrant, Saint Remy les Chevreuse (FR); Jerome Francois Knoplioch, Neuilly sur Seine (FR)

(73) Assignee: General Electric Company, Schenectady, NY (US)

( * ) Notice: Subject to any disclaimer, the term of this patent is extended or adjusted under 35 U.S.C. 154(b) by 517 days.

This patent is subject to a terminal disclaimer.

(21) Appl. No.: 10/302,135

(22) Filed: Nov. 22, 2002

(65) Prior Publication Data

US 2003/0167001 A1 Sep. 4, 2003

(51) Int. Cl.
*A61B 5/05* (2006.01)
(52) U.S. Cl. ............... 600/425; 600/407; 600/476; 382/128; 382/131
(58) Field of Classification Search ............ 600/407, 600/425, 476; 382/128, 131
See application file for complete search history.

(56) References Cited

U.S. PATENT DOCUMENTS 5,577,131 A * 11/1996 Oddou ............... 382/173
5,779,634 A 7/1998 Ema et al.
5,790,690 A 8/1998 Doi et al.
5,807,256 A 9/1998 Taguchi et al.
6,011,862 A 1/2000 Doi et al.
6,138,045 A 10/2000 Kupinski et al.
6,141,437 A 10/2000 Xu et al.
6,693,962 B1 * 2/2004 Murching et al. ...... 375/240.11
6,766,043 B2 * 7/2004 Zeng et al. ............ 382/128
6,985,612 B2 * 1/2006 Hahn .................. 382/128
2002/0007122 A1 * 1/2002 Kaufman et al. ........ 600/476
2002/0028008 A1 3/2002 Fan et al.
2002/0090121 A1 * 7/2002 Schneider et al. ........ 382/128
2002/0094119 A1 7/2002 Sahadevan
2002/0141627 A1 10/2002 Romsdahl et al.
2002/0164061 A1 * 11/2002 Paik et al. ............. 382/131
2002/0177551 A1 11/2002 Terman
2003/0026503 A1 2/2003 Kallergi et al.
2003/0053697 A1 3/2003 Aylward et al.
2003/0072479 A1 4/2003 Totterman et al.
2004/0252870 A1 * 12/2004 Reeves et al. .......... 382/128

* cited by examiner

*Primary Examiner*—Eleni Mantis Mercader
*Assistant Examiner*—Baisakhi Roy
(74) *Attorney, Agent, or Firm*—Armstrong Teasdale LLP

(57) ABSTRACT

For the automatic detection and characterization of nodules in a tomographic image of an anatomical zone of a patient, the image is segmented for identifying therein a region of interest, and the segmented image is processed for identifying the nodule.

During the processing step, an ellipsoid inscribed in the region of interest is modeled for deciding whether the image elements inscribed in this ellipsoid correspond to a nodule, and, for each zone of the region of interest extending beyond the ellipsoid, the image elements are identified which do not belong to the module according to mathematical morphologic criteria.

31 Claims, 9 Drawing Sheets

METHOD FOR THE DETECTION AND AUTOMATIC CHARACTERIZATION OF NODULES IN A TOMOGRAPHIC IMAGE AND A SYSTEM OF MEDICAL IMAGING BY TOMODENSIMETRY

CROSS REFERENCE TO RELATED APPLICATIONS

This application claims the benefit of French Application No. 01 15187 filed Nov. 23, 2001.

BACKGROUND OF THE INVENTION

1. Field of the Invention

The present invention concerns a process of automatic detection and characterization of nodules in a tomographic image of an anatomical zone of a patient, and also a tomodensimetric medical imaging system permitting such a detection method to be implemented.

2. Description of the Related Art

An application of such a method of particular interest is in the field of medical imaging, and in particular in oncology, especially for the early detection of lung cancers by the early detection and characterization of pulmonary nodules.

Indeed, the early detection of nodules has a direct influence on the rate of survival of patients to a term of five years.

Indeed, at the present time, the rate of survival to five years can reach or even exceed 80%, while for a late detection the rate of survival falls to about 10%.

It is generally accepted that the growth of cells of a malignant tumor is on the whole exponential. Thus a method of detecting cancers consists of monitoring the growth of a suspect lesion. A technique permitting the implementation of this method consists of determining and monitoring the size of pulmonary nodules.

Historically, this monitoring was performed using two-dimensional images and evaluating the size of the module by using a measuring system with two coordinates.

It can be understood that an improvement consists of examining the nodules by using a tomographic image of the lung, that is, a three-dimensional image. This method of medical imaging enables an organ to be examined using x-rays, plane by plane, while measuring by means of detectors, differences of density of x-ray absorption by the biological tissues. Data coming from these detectors are processed by a calculator for reconstituting in three dimensions the image of the organ examined.

Thus tomographic imaging constitutes a tool providing valuable aid for the early detection of cancers.

Nevertheless, the nodules are generally associated with a vascular field, or with the wall of the organ examined. It is thus necessary, before processing to precisely identify the nodule. This is generally performed by manually entering the discriminant parameters permitting the extraction of the image of an object of interest.

In view of the above, the invention is proposed of providing a method permitting an automatic extraction of nodules in a tomographic image of an anatomical zone of a patient.

Thus according to the invention such a method comprises a segmentation of the image to identify a region of interest in the image, and a processing of the segmented image to identify the nodule.

SUMMARY OF THE INVENTION

According to an aspect of this method, in the course of the processing step, an ellipsoid inscribed in the region of interest is modeled, it is decided that the image elements inscribed in this ellipsoid correspond to a nodule and, for each zone of the region of interest extending outside the ellipsoid, the image elements are identified which do not belong to the nodule according to mathematical morphologic criteria.

According to a mode of implementation of this method, a Euclidean distance field is produced with respect to the perimeter of the segmented region of interest, the image elements locally having the greatest distance value are determined, and the center of the ellipsoid is positioned on an image element having the greatest distance value.

According to an advantageous feature of this method, the said ellipsoid is constituted by a sphere having the said center and inscribed in the element of interest.

According to another feature of this method, a geodesic distance transformation is performed so as to create, starting from the said center, geodesic surfaces respectively extending to increasing distances with respect to the said center, each delimited by a set of image elements inscribed in the element of interest and equidistant from the center.

Preferably, during the step of identification of image elements not belonging to the nodule, a separate processing is performed of each geodesic surface situated outside the said sphere so as to determine whether the image elements which constitute it correspond at least partially to a nodule.

During the treatment of each geodesic surface, a discriminant analysis is performed starting from at least one morphologic criterion chosen from among the distance separating it from the center of the sphere, the connectivity of the image elements of a geodesic surface with the preceding ones, and the maximum Euclidean distance over this image element.

According to another feature of this method, the initial step of segmentation is implemented by morphologic segmentation, in particular by the extraction of water separation lines.

According to another advantageous embodiment of this method, a preliminary filtering is performed, during which a volume is produced within which a portion of the image likely to include a nodule is inscribed, the said segmentation step being implemented on the image elements of the said volume.

According to a feature of this embodiment, the step of filtering is implemented by a thresholding of numerical values associated with the image elements.

As a variant, the said step of thresholding is implemented by morphologic segmentation, in particular by the extraction of water separation lines.

To produce the volume, a histogram is for example produced of Boolean identification variables of the said portion of the image likely to include a nodule, the Boolean variables being derived from the filtering f the numerical values respectively associated with image elements extending from the selected point along to a set of directions, the said volume being produced starting from the said Boolean variables.

According to yet another embodiment, preceding the step of segmentation, a step is furthermore performed of detection of the wall of an organ of the anatomical zone examined, a mask is produced starting from the detected wall, and the mask is applied to the tomographic image.

During the step of detection of the wall of the organ, a volume is modeled, for example, having a contour applied against the internal wall of the organ within the organ, and the contour of the said volume is then filtered for extracting from it the image elements not belonging to the said wall.

The invention likewise has as its object a computer program intended to be loaded into the internal memory of a calculator, characterized in that it comprises a set of instruction codes adapted to the implementation of a method such as defined hereinabove.

According to the invention, a tomodensimetric medical imaging system is likewise proposed, comprising an x-ray emitter, corresponding detection means capable of measuring differences of the density of x-ray absorption by tissues of an anatomical zone examined, and a calculator for processing the signals originating from the detection means, for producing an image of the said anatomical zone, the calculator comprising means for image segmentation for identifying a region of interest in the said zone, and means for processing the segmented image for identifying nodules present therein.

According to an aspect of this system, the calculator furthermore has means to model an ellipsoid inscribed in the region of interest, for deciding that the image elements inscribed in this ellipsoid correspond to a nodule, and means for analysis by mathematical morphology for identifying, in each zone of the region of interest extending outside the ellipsoid, image elements not belonging to the nodule.

Other objects, features and advantages of the invention will become apparent from the following description, given solely by way of non-limitative example and with reference to the accompanying drawings.

DESCRIPTION OF THE DRAWINGS

FIG. 5 shows a distance field illustrating the step of transformation of Euclidean distance;

FIG. 6 shows a field of geodesic distance values obtained from the step of transformation of geodesic distance;

DESCRIPTION OF THE PREFERRED EMBODIMENT

Figure 1:
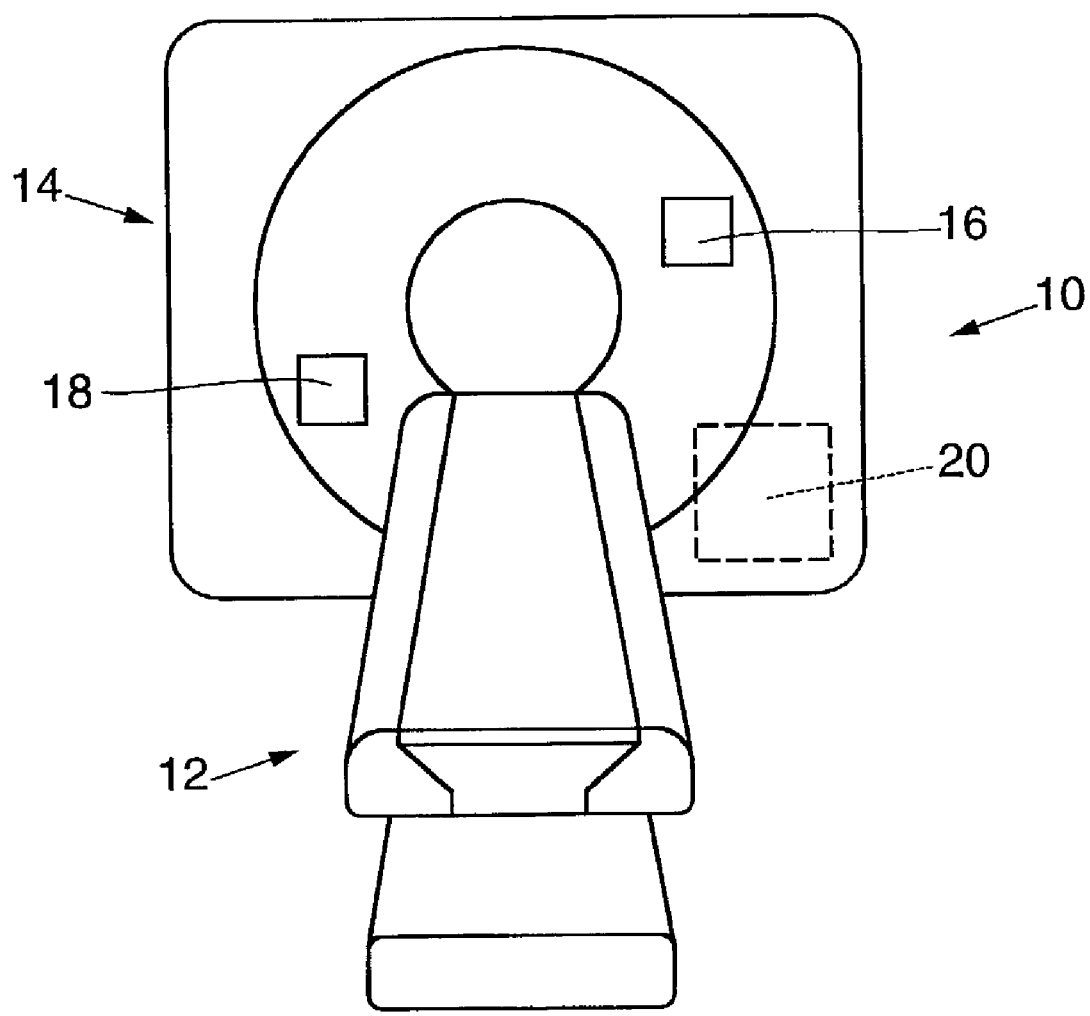
FIG. 1 is a schematic perspective view of a tomodensimetric medical imaging system according to the invention.

A schematic perspective view is shown in FIG. 1 of a tomodensimetric medical imaging system according to the invention, denoted by the general reference numeral 10.

In the application considered, it is intended for the detection of pulmonary nodules for the early detection of cancers.

As can be seen in FIG. 1, the imaging system 10 essentially comprises an examination table 12 on which a patient to be examined has been placed, and a tomodensimetric imaging system 14 conventionally emitting x-rays toward an anatomical zone of the patient, the detection of densities of x-ray absorption by the biological tissues examined, and the processing of these data by means of a calculator for producing an image in three dimensions of an organ, in this instance a patient's lungs.

For this purpose, the imaging system 14 comprises an x-ray emitter 16 supported by a turntable so as to be driven around the anatomical zone to be examined, and corresponding detection means 18, permitting the measurement of differences of density of x-ray absorption by the biological tissues examined, by recovering the x-rays coming from the emitter 16 and converting these x-rays into electronic signals.

A central unit 20, shown, schematically, recovers the data coming from the detection means 18 in order to reconstruct an image in three dimensions of the organ or organs examined, from successive axial sections, typically 1-10 mm in thickness.

The central unit 20 is connected to a man/machine interface (not shown) permitting data entry on the one hand, and visualization of the images thus formed by means of a display device, on the other hand.

Furthermore, the central processing unit 20 comprises at least one microprocessor connected to at least one memory into which all the software is loaded for the processing of the signals output from the detection means 18 for the formation of images from successive axial sections, and for the processing of the thus formed image for the detection of pulmonary nodules.

Figure 2:
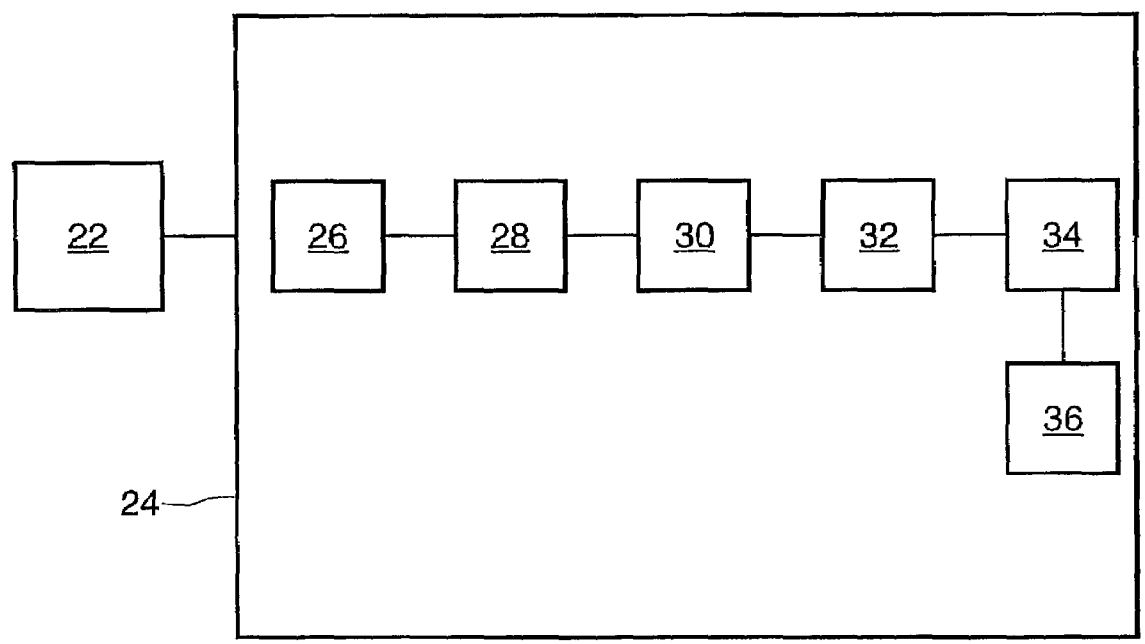
FIG. 2 illustrates the general structure of a calculator of the imaging system of FIG. 1.

Referring to FIG. 2, these software means are constituted by a set of software modules performing, on the one hand, the reconstruction of the image, and on the other hand, the actual detection of the modules.

It can in fact be seen in FIG. 2 that the central unit 20 comprises, stored in memory, a first software module 22 of conventional type performing a treatment of data output from the detection means 18 for forming a image in three dimensions of the organ or organs examined.

These software means are constituted by a set of instruction codes of conventional type. They will therefore not be described in detail hereinafter.

It will nevertheless be noted that, as previously mentioned, they permit the reconstruction of an image in three dimensions from successive axial sections, 1-10 mm in thickness, of the organ, as is known per se in the field of tomodensimetric medical imaging.

This image is directly presented to an operator by means of the display device.

In such images, the pulmonary nodules are relatively difficult to identify and detect, particularly because of the large amount of data furnished by such images. Consequently, the central unit is furthermore provided with a software stage 24 performing an automatic detection of pulmonary nodules in the image presented to the operator.

As can be seen in FIG. 2, this software stage 24 comprises a first module 26 effecting a preliminary filtering of the image, from a point selected by an operator, using a technique of preliminary segmentation, so as to produce a volume in which is inscribed a portion of the image likely to include a nodule.

Figure 3:
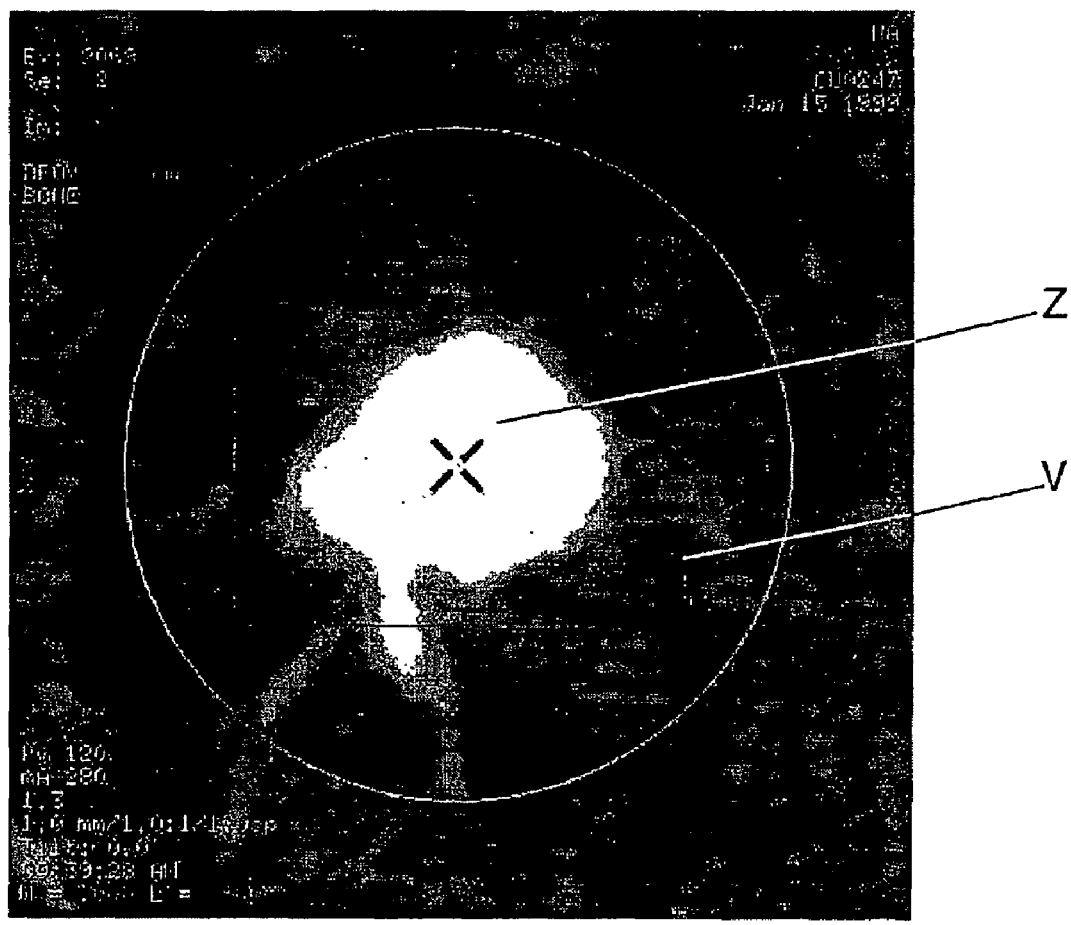
FIG. 3 is a radiographic image obtained by means of the system of FIG. 1, showing the selection of a suspect zone.

Preferably, and as can be seen in FIG. 3, this step of preliminary identification is preferably effected based on a two-dimensional image, the operator selecting, by means of a cursor represented by a cross X, a point of a zone Z considered to be suspect, which suspect zone corresponds to a portion of the image likely to include a nodule.

As will be described in detail hereinafter, in response to such a selection, the central unit 20 produces a volume V in which is inscribed the whole of this image portion Z, and the processing of the image is essentially effected on this suspect volume.

For this purpose, the first software module 26 incorporates filtering means performing processing of relative density levels of each voxel in a set of predetermined directions, preferably in all directions, so as to determine which image portion belongs to a suspect object, that is, an object constituted by a nodule, of an associated vascular tree, and if necessary, the pulmonary wall, . . . , and those which do not belong to such an object, that is, those which correspond to the background of the image.

These treatment means can be constituted by means for thresholding values of relative density associated with each image element. Thus, for example, a threshold is fixed equal to −332 HU (Hounsfield units).

Alternatively, a morphologic segmentation could likewise be used, for example, a technique termed "water separation line" (WSL), which will be described in detail hereinafter.

The filtering means are likewise connected to memory means permitting the production of a histogram in which are memorized, for the set of voxels extending in all directions from the selected point, the Boolean variables output from the filtering, by thresholding or by morphologic segmentation, which Boolean variables indicate whether or not the corresponding image element belongs to a portion of image likely to include a suspect object.

The first software module 26 is connected to a second software module 28 comprising the actual segmentation means for the digital image.

The essential function of this module is to carry out appropriate image processing for identifying an element of interest in the image delivered by the upstream software stage or, in other words, to extract the background of the image.

This segmentation module preferably comprises means for morphologic segmentation. Advantageously, the extraction technique of water separation lines is used, which uses luminance gradient data for determining the contours in three dimensions which are described by a discontinuity of luminance in the volumetric data.

Such a technique is constituted by a technique of conventional mathematical morphology which is familiar to a person skilled in the art. It is described in the publication "Morphological Segmentation" by F. Meyer and S. Beucher, which appeared in the journal "Journal of Visual Communication and Image Representation", Volume 1, No. 1, September 1990, pages 21-46. It will therefore not be described in detail hereinafter.

However, for a better understanding of this mathematical morphology and, more particularly, this WSL technique, it may be advisable for the luminance function to be represented as a relief, the image points at levels of gray appearing brighter the higher they are. The same applies to the gradient of this luminance function.

In this relief, the crest lines of the gradient correspond to frontiers of regions to be segmented. An image can then be considered as a juxtaposition of basins, at the bottom of which a local minimum exists.

If a progressive flooding of the relief is performed starting from the local minima, each time the waters coming from two adjacent local minima meet, a dike can be constructed along the crest line corresponding to this line of meeting, such that the waters coming from the two distinct basins do not mix.

As will be described in detail hereinafter, and with reference to FIG. 4, the segmented image resulting from the processing effected by this second software module essentially appears in the form of a nodule and of a vascular tree V' associated therewith.

Again referring to FIG. 2, the software stage 24 furthermore comprises a module 30 for distance transformation implementing an Euclidean distance field calculation for each voxel of the segmented image, with respect to the perimeter of the region of interest.

This module essentially has the role of permitting the modeling of an ellipsoid, in this instance a sphere within the element of interest and, in particular, the largest sphere inscribed within the element of interest.

Figure 5:
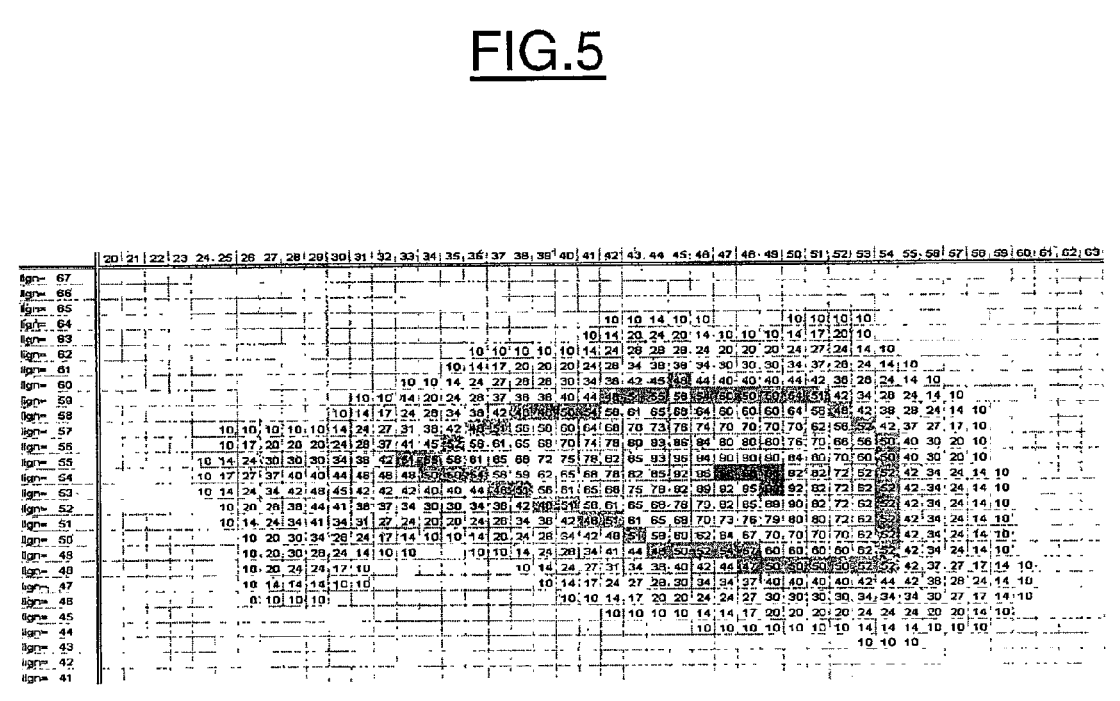

For each slice, there is obtained the distance field which can be seen in FIG. 5.

This third software module 30 is associated with a module 32 for geodesic distance transformation.

This fourth module performs, as will be described hereinafter, the creation of geodesic surfaces respectively extending to increasing distances with respect to the center of the largest sphere inscribed within the element of interest and each delimited by a set of voxels inscribed within this element of interest and equidistant from the center.

At the output of the processing effected by this fourth software module 32, there is obtained, for each axial image slice, a field of geodesic distance values, for each voxel of the region of interest.

Finally, a fifth software module 34 undertakes a separate analysis of each geodesic surface situated outside the previously modeled sphere, so as to determine whether the voxels which constitute it correspond or not, at least partially, to a nodule.

It will be noted that the fifth software module is constituted by a discriminant analysis module performing, for example, the detection of a sudden variation of morphologic criteria, such as the distance separating each voxel from the center of the sphere, the connectivity of the voxels of a geodesic surface with the preceding ones, that is, the difference of relative density level between adjacent voxels, and the maximum Euclidean distance on the set of voxels of a given layer, to effect a discrimination between the nodule and the vessels associated with it.

In other words, this software module performs the extraction of the voxels corresponding to the vessels thus identified.

Figure 7:
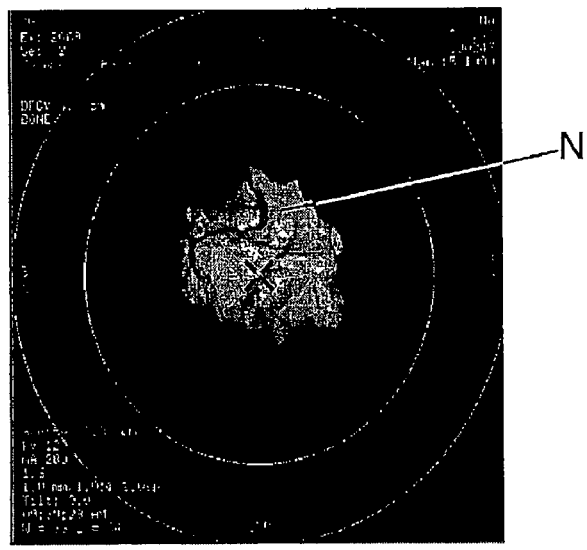
FIGS. 7 and 8 are images obtained by means of the imaging system of FIG. 1, at the output of the step of identification of image elements not belonging to the nodule, respectively showing an identified nodule and a vascular tree, extracted from the segmented image.
Figure 8:
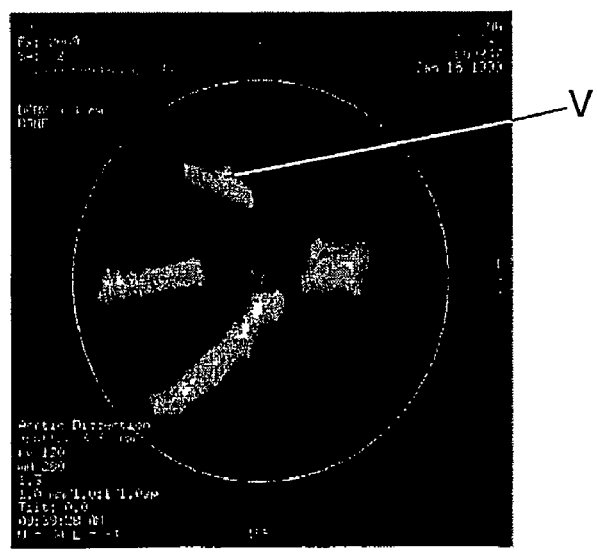

The images which can be seen in FIGS. 7 and 8 are then obtained, respectively corresponding to the nodules thus identified and to the vessels extracted from the image.

Finally, the software stage 24 incorporates a sixth software module 36 serving to determine the volume of the nodule according to conventional techniques.

Figure 9:
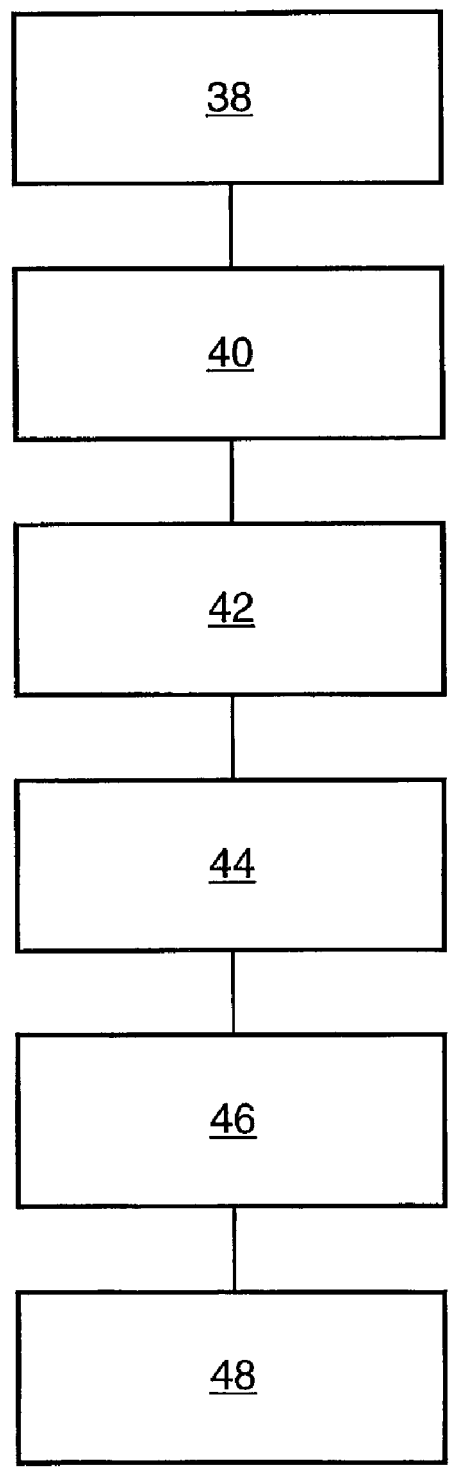
FIG. 9 illustrates the principal phases of a method of automatic detection of pulmonary nodules, implemented by means of the medical imaging system and calculator of FIGS. 1 and 2.

The principal phases of the method of automatic detection of nodules in a tomographic image according to the invention, using the medical imaging system described hereinabove, will now be described with reference to FIG. 9.

In the course of a first phase 38 of this method, the user selects a suspect zone, that is, a zone of the tomographic image assessed by the operator to include a nodule.

During the following step 40, a preliminary segmentation of the image in three dimensions is performed so as to identify, as previously mentioned, the portions of the image likely to include a nodule, by producing a histogram which regroups, for each direction from a point selected by the operator, the voxels and the Boolean variables which are respectively associated therewith and which are obtained by filtering relative density values. From this histogram, a suspect volume V is then produced.

To perform the calculation of this histogram there is preferably used a filtering function with hysteresis, so as to avoid the appearance of errors of discontinuity or of segmentation.

As can be seen in FIG. 3, at the output of this step 40 a volume V has been produced within which is inscribed a portion of the image, that is, a zone of the image which includes a nodule, some background, some vessels, and if necessary the wall of the lung.

During the following step 42, a segmentation, properly so called, of the image is performed for identifying therein a region of interest, that is, a discrimination is implemented between on the one hand, a nodule, vessels, and the lung wall, and on the other hand, the background.

As previously mentioned, the segmentation implemented during this step 42 is performed by morphologic separation, in particular, by extraction of water separation lines.

Figure 4:
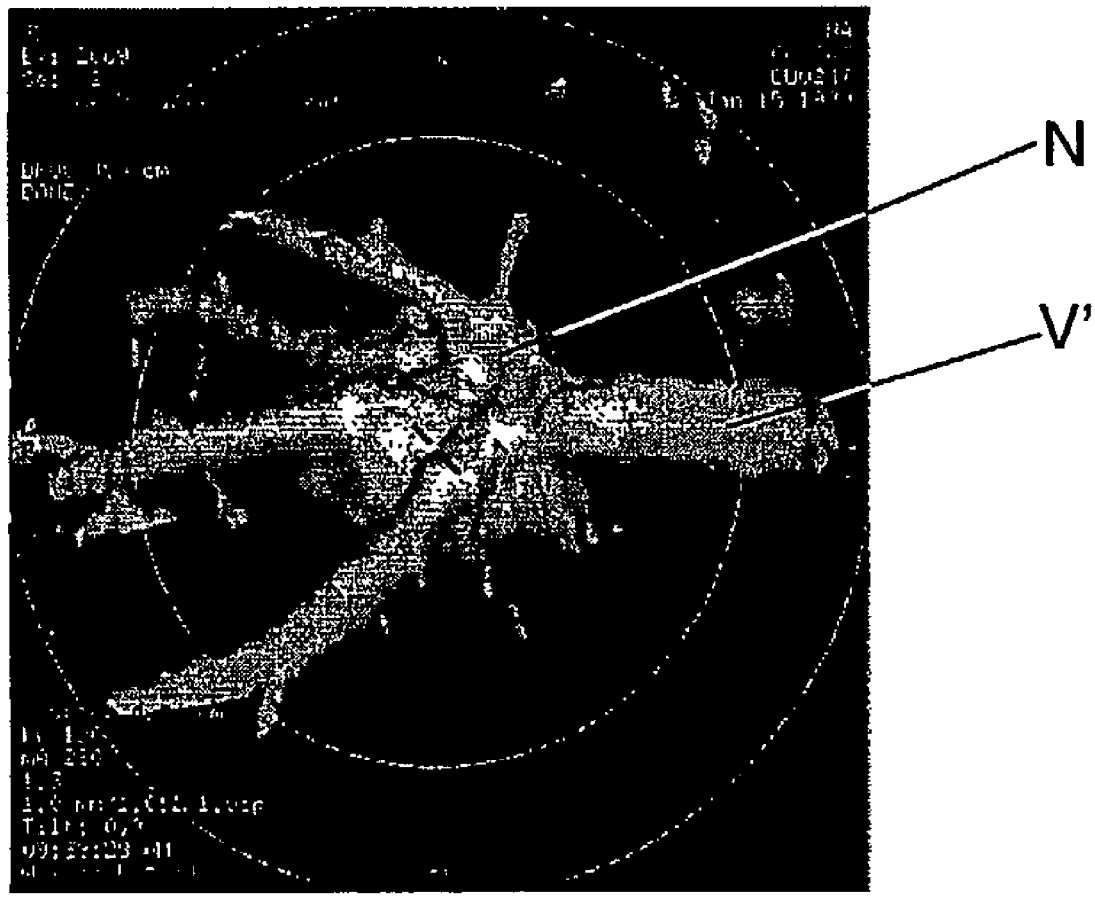
FIG. 4 shows the image obtained at the output of the step of segmentation by extraction of water separation lines.

There is then obtained the image which can be seen in FIG. 4 and which corresponds to an image in three dimensions of a nodule N and of the vessels associated with it.

During the following step 44, the calculator 20 performs a modeling of an ellipsoid inscribed in the region of interest, so as to decide that the voxels inscribed in this latter will correspond to a nodule.

To do this, and as previously described with reference to FIG. 5, an Euclidean distance field is produced with respect to the perimeter of the region of interest. A null numerical value is thus associated with the voxels situated on the perimeter of the region of interest, and a high numerical value with the voxels situated at the greatest distance from the perimeter.

It is then decided that the voxel having the greatest distance value constitutes the center of the ellipsoid. This ellipsoid is constituted by a sphere.

In this case, the sphere is chosen as being the largest of the spheres having as center the point previously mentioned and being inscribed within the region of interest.

During the following step 46, the calculator 20 proceeds to a phase of geodesic distance transformation, so as to create geodesic surfaces each inscribed within the element of interest and each constituted by a set of voxels equidistant from the center.

Figure 6:
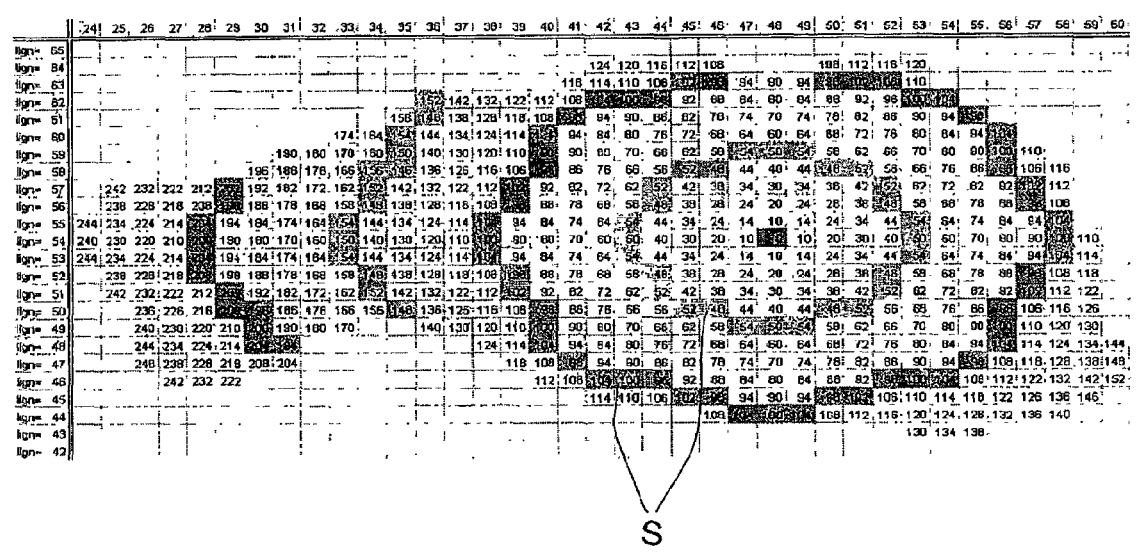

As shown in FIG. 6, these geodesic surfaces are created from the center and extending to an increasing distance with respect thereto. They are formed by assigning to each voxel of each geodesic surface the same numerical value of geodesic distance.

It can be understood that the geodesic surfaces situated within the largest sphere inscribed in the element of interest are generally themselves constituted by spheres, the geodesic surfaces extending outside the latter being formed by substantially concave surfaces which can be partially or not included, or not, in a vessel or in a nodule.

The calculator then identifies the voxels inscribed in the largest sphere as corresponding to a nodule, and proceeds to a separate treatment of each geodesic surface situated outside the sphere, so as to determine whether or not the voxels which constitute it correspond to a nodule.

As mentioned previously, this step is essentially effected by detecting a sudden increase of morphologic criteria, such as the connectivity of the voxels and the distance separating them from the center of the sphere.

During the following step 48, a display in three dimensions of the nodule thus identified, and a calculation of its volume, are then performed.

Finally, it will be noted that the invention just described permits a detection of pleural nodules, that is, nodules extending from the wall of a lung.

In this case, for implementing the detection of such nodules, preceding the step of segmentation mentioned hereinabove, a detection of the wall of the lung is performed, a mask is produced from this detected wall, and the mask is applied to the tomographic image of the lung, so as to extract the lung wall therefrom.

To do this, for example, a volume with a closed contour is caused to grow in the lung until the said contour is applied against the wall P of the lung.

Figure 10:
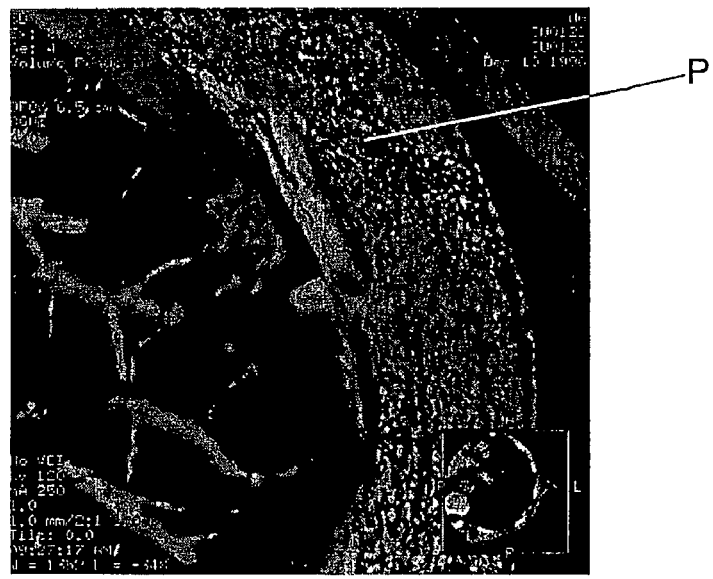
FIGS. 10 and 11 are radiographic images illustrating an embodiment permitting an identification of pleural nodules.
Figure 11:
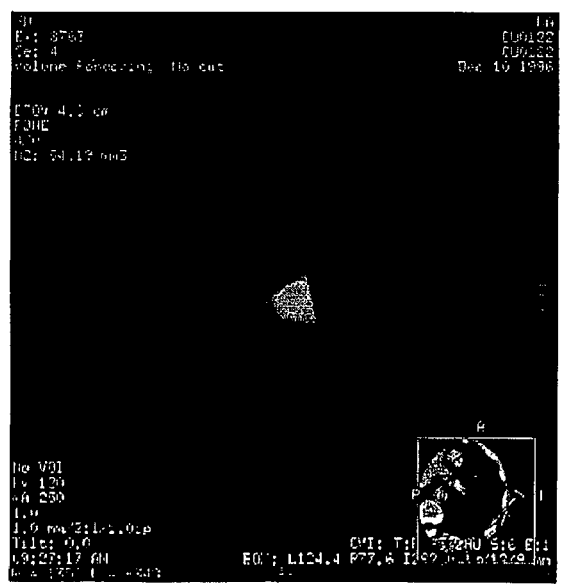

The shape thus obtained is then simplified so as to ormit the vessels from [reading "des nodules" for "les nodules"] the nodules, using a morphologic tool, After the extraction of the wall of the lung, the nodule is then processed using the previously mentioned technology (FIGS. 10 and 11).

The invention claimed is:

1. Method of automatic detection and characterization of nodules (N) in a tomographic image of an anatomical zone of a patient, comprising a segmentation of the image for identifying therein a region of interest (N, V) by determining a contour in three dimensions using water separation lines of luminance gradient data of the image to determine a discontinuity of luminance in the data, and the processing of the segmented image for identifying the nodule (N), wherein during the step of processing, an ellipsoid inscribed within the region of interest is modeled, it is decided that the image elements inscribed within this ellipsoid correspond to a nodule and, for each zone of the region of interest extending outside the ellipsoid, the image elements are identified which do not belong to the nodule, according to criteria of mathematical morphology.

2. Method according to claim 1, wherein a Euclidean distance field is produced with respect to the perimeter of the segmented region of interest, the image elements locally having the greatest distance value are determined, and the center of the ellipsoid is positioned on an image element having the greatest distance value.

3. Method according to claim 2, wherein the said ellipsoid is constituted by a sphere delimited by the greatest spherical volume having the said center and inscribed within the element of interest.

4. Method according to claim 2, wherein a geodesic distance transformation is performed so as to create, starting from the said center, geodesic surfaces (S) respectively extending at increasing distances with respect thereto and each delimited by a set of image elements inscribed within the element of interest and equidistant from the center.

5. Method according to claim 4, wherein, during the step of identification of image elements not belonging to the nodule, a separate processing is performed of each geodesic surface (S) situated outside the said sphere so as to determine whether the image elements which constitute it correspond at least partially to a nodule.

6. Method according to claim 5, wherein, during the processing of each geodesic surface, a discriminant analysis is performed from at least one morphologic criterion chosen from among the distance separating it from the center of the sphere, the connectivity of the image elements of the geodesic surface with the preceding ones, and the maximum Euclidean distance on this image element.

7. Method according to claim 1, wherein, preceding the segmentation step, a preliminary filtering is performed during which a volume (V) is produced in which is inscribed a portion of the image likely to include a nodule, the said step of segmentation being implemented on the image elements of the said volume.

8. Method according to claim 7, wherein the step of filtering is implemented by a thresholding of numerical values associated with the image elements.

9. Method according to claim 7, wherein the said step of thresholding is implemented by morphologic segmentation, in particular by extraction of water separation lines (WSL).

10. Method according to claim 7, wherein, starting from a selected point (X), a histogram is produced of Boolean identification variables of the said portion of the image likely to include a nodule (N), the Boolean variables being the output of filtering of the numerical values respectively associated with image elements extending from the selected point along a set of directions, the said volume (V) being produced from the said Boolean variables.

11. Method according to claim 1, wherein, preceding the segmentation step, furthermore a step is performed of detection of the wall (P) of an organ of the anatomical zone examined, a mask is produced from the detected wall, and the mask is applied to the tomographic image.

12. Method according to claim 11, wherein, during the step of detection of the wall of the organ, a volume is modeled with a contour applied against the internal wall of the organ within the organ, and the contour of the said volume is then filtered for extracting therefrom image elements not belonging to the said wall.

13. Use of a method according to claim 1 for the detection and the characterization of pulmonary nodules.

14. A method in accordance with claim 1 wherein the region of interest is a volumetric region, said method further comprising determining a contour in three dimensions using water separation lines of luminance gradient data of the image to determine a discontinuity of luminance in the volumetric data.

15. Computer program loaded into the internal memory of a calculator, wherein said computer program includes at least one code segment configured to instruct the calculator to identify a region of interest (N,V) in a segmentation of a tomographic image of an anatomical zone of a patient by:
determining a contour in three dimensions using water separation lines of luminance gradient data of the image to determine a discontinuity of luminance in the data;
modeling an ellipsoid inscribed within the region of interest, wherein image elements inscribed within this ellipsoid correspond to a nodule; and
identifying for each zone of the region of interest extending outside the ellipsoid, the image elements which do not belong to the nodule, according to criteria of mathematical morphology.

16. Tomodensimetric medical imaging system, comprising an x-ray emitter (16), corresponding detection means (18) capable of measuring differences of absorption density of x-rays by the tissues of an anatomical zone examined, and a calculator (20) for processing signals output from the detection means (18) for producing an image of the said anatomical zone, the calculator (20) comprising image segmentation means (28) for identifying a region of interest in the said image by determining a contour in three dimensions using water separation lines of luminance gradient data of the image to determine a discontinuity of luminance in the data, and means (30, 32, 34, 36) for processing the segmented image for the identification of nodules present therein, wherein the calculator (20) furthermore comprises means (30) for modeling an ellipsoid inscribed within the region of interest for deciding that the image elements inscribed in this ellipsoid correspond to a nodule, and means (32, 34) for analysis by mathematical morphology for identifying, in each zone of the region of interest extending outside the ellipsoid, the image elements not belonging to the nodule.

17. A method of automatic analysis of nodules in a tomographic image of an object comprising:
identifying a suspect zone that includes a nodule;
extracting a sub volume of the 3D image that includes the nodule;
identifying a region of interest in the sub volume by determining a contour in three dimensions using an extraction of water separation lines of luminance gradient data of the image to determine a discontinuity of luminance in the data;
identifying the nodule type wherein the type includes at least one of a well-circumscribed nodule, a vascularized nodule, and a pleural nodule;
segmenting the nodule based on its type; and
displaying the segmented nodule.

18. A method in accordance with claim 17 wherein if the nodule is identified as a pleural nodule, segmenting the nodule based on its type comprises:
determining a wall of the object from which the nodules extend;
generating a mask from the wall; and
applying the mask to the image such that the object wall is extracted from the image.

19. A method in accordance with claim 17 wherein if the nodule is identified as a pleural nodule, segmenting the nodule based on its type comprises:
growing a volume with a closed contour in the object until the contour is applied against the wall of the object;
simplifying the shape of the closed contour using a morphologic tool such that a vessel leading from the nodule is omitted.

20. A method in accordance with claim 17 wherein segmenting the nodule based on its type comprises:
filtering relative density values of the image voxels in each direction from a point selected by the operator;
determining an associated Boolean variable for each voxel based on whether the corresponding voxel is included within the portion of the image likely to include a suspect volume;
generating a histogram that regroups the voxels and the Boolean variables; and
filtering the histogram using hysteresis to determine a suspect volume, wherein the hysteresis facilitates reducing an appearance of errors of discontinuity or of segmentation.

21. A method in accordance with claim 17 wherein segmenting the nodule based on its type comprises determining a sub volume that includes at least a portion of the nodule and at least one of background tissue, a vessel, and a portion of a wall of a lung.

22. A method in accordance with claim 17 wherein segmenting the nodule based on its type comprises generating a Euclidean distance field with respect to the perimeter of the region of interest.

23. A method in accordance with claim 17 wherein segmenting the nodule based on its type comprises:
associating a null numerical value with the voxels located on the perimeter of the region of interest; and
associating a high numerical value with the voxels situated at the greatest distance from the perimeter.

24. A method in accordance with claim 17 wherein segmenting the nodule based on its type comprises determining the voxel having the greatest distance value as the center of the ellipsoid.

25. A method in accordance with claim 17 wherein segmenting the nodule based on its type comprises modeling a sphere.

26. A method in accordance with claim 17 wherein segmenting the nodule based on its type comprises determining the largest sphere centered at the center of the ellipsoid and being inscribed within the region of interest.

27. A method in accordance with claim 17 wherein segmenting the nodule based on its type comprises determining the geodesic surfaces from the center of the ellipsoid and extending to an increasing distance with respect thereto.

28. A method in accordance with claim 17 wherein segmenting the nodule based on its type comprises assigning to each voxel of each geodesic surface the same numerical value of a geodesic distance.

29. A method in accordance with claim 17 wherein segmenting the nodule based on its type comprises determining whether each geodesic surface located outside the sphere are included in a nodule by detecting a sudden increase of morphologic criteria, including at least one of the connectivity of the voxels and the distance separating them from the center of the sphere.

30. A method in accordance with claim 17 further comprising:

calculating a volume of the nodule; and displaying the nodule volume.

31. A method in accordance with claim 17 wherein identifying a suspect zone that includes a nodule comprises at least one of selecting a suspect zone by a user and automatically determining a suspect zone.

* * * * *